Nov. 6, 1956
T. M. EVANS
2,769,954
REACTORS AND REACTOR CONNECTIONS
Filed March 9, 1953
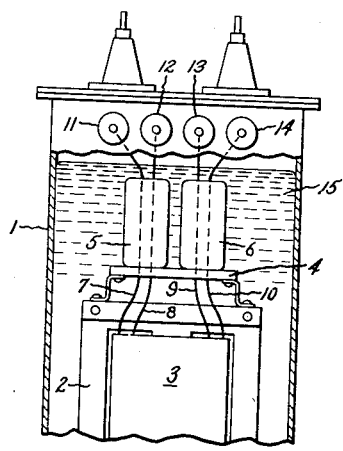
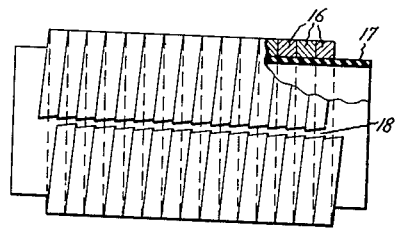
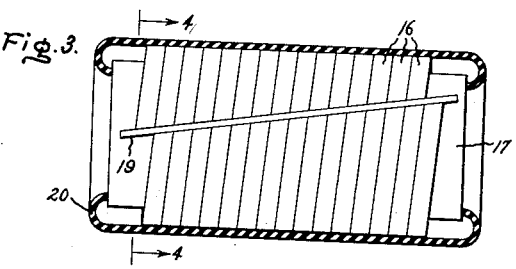
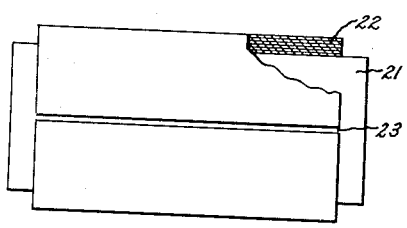
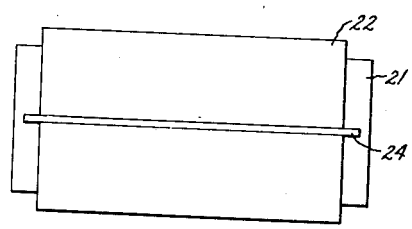
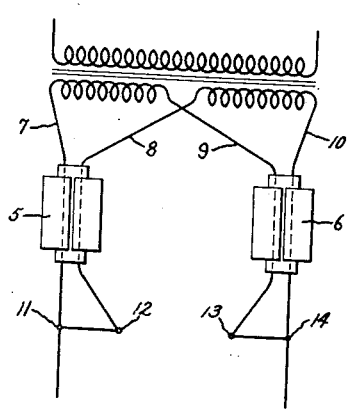
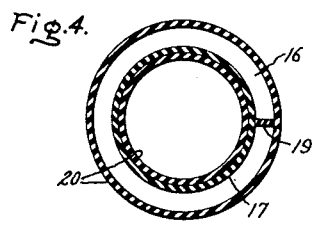
Inventor:
Thomas M. Evans,
by Gilbert P. Tarleton
His Attorney.

United States Patent Office 2,769,954
Patented Nov. 6, 1956

2,769,954

REACTORS AND REACTOR CONNECTIONS

Thomas M. Evans, Pittsfield, Mass., assignor to General Electric Company, a corporation of New York Application March 9, 1953, Serial No. 341,005

6 Claims. (Cl. 323—61)

This invention relates to reactors, and more particularly, to reactor cores with adjustable gaps.

This invention also relates to reactor connections, and more particularly, to a system of connecting reactors in the secondary windings of a transformer.

A known form of reactor core comprises a stack of axially aligned square punchings, each punching having a round hole and a gap extending from the hole to one of the corners of the punching. The hole is for the reception of current carrying windings, either of one or multiple turns. Because of the square configuration of these punchings it is very difficult to vary the gap in this form of reactor core during field installation.

Reactors are used in adjusting the impedances of transformers. For instance, it may be desired to connect in parallel two transformers, each of the transformers having two secondary windings and being rated about equally but having different impedances. To make the load divide equally between the two transformers, the transformer with the smaller amount of impedance will have to have its impedance brought up to the impedance of the other transformer. In the prior art, after the impedances of the two transformers connected in parallel were balanced for say series operation of the transformer secondaries, the connections and reactors would have to be altered to change to parallel operation of the transformer secondaries. The same was true in initially balancing the transformer impedances for parallel operation of the secondaries, and then changing to series operation. That is, one set of reactors and connections would not serve both parallel and series operation of the transformer secondaries, but extensive changes were necessitated.

It is an object of this invention to provide reactor cores with adjustable gaps which can be easily adjusted during field installation.

It is a further object of this invention to provide a system of connecting reactors in the secondary windings of a first transformer so that once the impedance of said first transformer is balanced with respect to the impedance of a second transformer with which it will be associated in parallel, the impedance characteristics of said first transformer will match the impedance characteristics of said second transformer, regardless of whether the two transformer secondaries of each transformer are both operated in series or parallel, without the necessity of changing reactors or reactor connections.

My invention comprises a laminated reactor core having a plurality of axially aligned and stacked annular metallic magnetic spring material washers snugly surrounding an insulating tube, each of said washers being split to form a gap therein, all of said gaps positioned on one side of said tube and being substantially aligned in a line and superimposed with respect to each other, said aligned and superimposed gaps having a wedge of insulating material therein to vary the reactance of said reactor core.

My invention farther comprises a laminated reactor core having a plurality of thin metallic magnetic spring material cylindrical tubes snugly concentrically disposed with respect to each other and snugly surrounding an insulating tube, each of said metallic tubes being split along the entire length thereof to form a gap therein, all of said gaps being positioned on one side of said insulating tube and being superimposed with respect to each other, said superimposed gaps having a wedge of insulating material therein to vary the reactance of said reactor core.

In a transformer having two secondary windings, my invention comprises a system of adding reactance to said windings comprising two hollow cylindrical reactors, the two leads of said windings having a like polarity passing through one of said reactors, and the two leads of said windings having a like polarity but opposite from said first mentioned two leads passing through the other of said reactors.

In a transformer apparatus enclosed within a tank, said tank having four secondary winding terminal bushings thereon, and said apparatus having two secondary windings each having a pair of terminal leads extending to and connected to said secondary terminal bushings, my invention comprises a system of adding reactance to said windings comprising positioning two hollow cylindrcal reactors within said tank, the two leads of said secondary windings having a like polarity passing through one of said reactors, and the two leads of said windings having a like polarity but opposite from said last mentioned two leads passing through the other of said reactors.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which:

Fig. 1 is a view of a transformer apparatus and the relative position of my reactors with respect to the transformer apparatus parts after reactors have been connected to said apparatus;

Fig. 2 is a side view, partly in section of a form of reactor core employing spring material washers having gaps therein;

Fig. 3 is another side view, partly in section, of the reactor core employing spring material washers having gaps therein after an insulating material wedge has been driven into the gaps;

Fig. 4 is an end section of the reactor employing spring material washers, the section being taken along the line 4—4 of Fig. 3;

Fig. 5 is a side view, partly in section, of another form of reactor core employing concentric thin spring material cylinders having gaps along the length thereof;

Fig. 6 is another side view of the reactor core employing concentric thin spring material cylinders having gaps therein after an insulating material wedge has been driven into the gaps;

Fig. 7 is a diagrammatic sketch of the system of connecting reactors to the transformer apparatus of Fig. 1, when the secondary windings of said transformer apparatus are connected in series;

Fig. 8 is a diagrammatic sketch of the system of connecting reactors to the transformer apparatus of Fig. 1, when the secondary windings of said transformer apparatus are connected in parallel.

In Figs. 1, 7, and 8, for purposes of clarity like reference numerals have been used to designate similar parts.

Referring now to the drawing, and particularly to Fig. 1, there is shown therein a transformer apparatus comprising a closed tank 1 enclosing a magnetic core 2 and electrical windings 3. Electrical windings 3 comprise a primary electrical winding and two secondary electrical windings having electrical leads 7, 8, 9, and 10, extending therefrom and connected to terminal bushings 11, 12, 13, and 14, respectively. Positioned on a bracket 4 mounted on magnetic core 2 are two hollow cylindrical reactors 5 and 6. The core 2, windings 3, and reactors 5 and 6 are submerged within a dielectric liquid 15. Leads 7 and 8 which are of like polarity pass through reactor 5, and leads 9 and 10 which are of like polarity but of a polarity opposite to that of leads 7 and 8 extend through reactor 6.

For operation of the transformer secondaries in series terminals 12 and 13 are connected together. For operation of the transformer secondaries in parallel terminals 11 and 12 and terminals 13 and 14 are connected together. As will appear later, reactors 5 and 6 have been added to the transformer apparatus of Fig. 1 to bring its impedance up to the impedance of another transformer with which it will be associated in parallel so that a load placed on the two paralleled transformers will divide equally between the two transformers regardless of whether the secondary windings of both transformers are each connected in series or parallel. Also, this will be so without entering tank 1 and altering reactors 5 and 6 or their connections with the secondary windings. Changing from series or parallel operation of the transformer secondaries will be accomplished at terminal bushings 11, 12, 13, and 14, alone, and the reactance characteristics of the transformer apparatus of Fig. 1 will always match the reactance characteristics of the transformer apparatus with which it is paralleled.

One form of reactor that can be used is shown in Figs. 2, 3, and 4. As best seen in Fig. 2, the reactor is a laminated structure comprising a plurality of axially aligned and stacked annular metallic magnetic spring material washers 16 which snugly surround a hollow insulating material tube 17. Each of the washers 16 is cut to form a gap 18 therein. All the gaps 18 are aligned in a line on the same side of the insulating material tube 17 and are superimposed with respect to each other. Due to the fact that the washers are annular and formed out of spring material they can be deformed readily to vary the width of the gaps 18 for varying the reactance of the reactor. Variation of the width of gaps 18 is easily accomplished by driving an elongated strip or wedge of insulating material 19 into the aligned and superimposed gaps 18, as clearly shown in Figs. 3 and 4. If increasing the width of the gaps 18 causes the washers 16 to become loose with respect to insulating tube 17 a suitable insulating material tape 20 can be used to hold the washers 16 in place on insulating tube 17, as clearly shown in Figs. 3 and 4.

Another form of reactor is shown in Figs. 5 and 6, which is a laminated structure comprising a plurality of thin metallic magnetic spring material cylinders or elongated annular portions 22 snugly concentrically disposed with respect to each other and snugly surrounding an insulating material tube 21. Each of the metallic cylinders or tubes 22 is cut along the entire length thereof to form a gap 23 therein. All the gaps 23 are positioned on the same side of the insulating tube 21 and are superimposed with respect to each other. Variation of the reactance of this form of reactor is readily accomplished by driving a strip or wedge of insulating material 24 into the superimposed gaps 23, as is shown clearly in Fig. 6. After the wedge 24 is driven into the gaps 23, should the thin metallic cylinders 22 become loose with respect to the insulating tube 21, a suitable insulating material tape can be employed as in the prior form of reactor as is shown clearly at 20 in Figs. 3 and 4.

In both forms of reactors the materials comprising the reactor cores are preferably constructed out of silicon steel with an anneal to give low losses. Also, the steel is formed and treated so that the flux runs with the grain rather than against the grain. The reactors will be designed so that with normal overloads the reactor core will not be saturated with flux, and the length of gap will be a minimum consistent with good design so that the reactor loss will be as little as possible. Assuming that the secondary windings of the transformer apparatus shown in Fig. 1 are to be connected in series and that this transformer is to be connected in parallel with a second transformer whose secondary windings are also connected in series but whose secondary windings have a greater impedance, if the two transformers are to carry an equal share of a load placed thereon, the impedance of the transformer apparatus in Fig. 1 will have to be brought up to the impedance of the second transformer. A diagrammatic illustration of the system of adding reactance to the secondary windings of the transformer apparatus of Fig. 1 is shown in Fig. 7. Shown therein are the two leads 7 and 8 of like polarity extending through reactor 5 and connected to terminals 11 and 12 respectively. Leads 9 and 10 of like polarity pass through reactor 6 and are connected to terminals 13 and 14 respectively. The relative direction of the passage of said leads through each reactor core is such that load current in said leads cumulatively magnetizes each core. Terminals 12 and 13 are connected together to place the transformer secondary windings in series. For series operation it is necessary to insulate leads 7 and 8 and leads 9 and 10 from each other.

The advantage of this system of incorporating reactors into the secondary windings is that if it is now desired to place each of the secondary windings of the two paralleled transformer in parallel this conversion can be readily accomplished at the terminal bushings without changing the reactors or system of incorporating the reactors in the secondary windings and the reactance characteristics of the two transformers will still be matched. That is, conversion is accomplished at the outside of the transformer tank at the terminal bushings. Fig. 8 shows diagrammatically the system of incorporating additional reactance into the secondary windings of the transformer of Fig. 1 when said windings are connceted in parallel. The same reactors 5 and 6 are used and as in Fig. 7 leads 7 and 8 pass through reactor 5 and are connected to terminals 11 and 12 respectively, and leads 9 and 10 pass through reactor 6 and are connected to terminals 13 and 14 respectively. The only change is that terminals 12 and 13 are now disconnected, and terminals 11 and 12 and terminals 13 and 14 are now interconnected.

In both Figs. 7 and 8, the leads 7, 8, 9, and 10, are shown as passing through each reactor only once. However, to get enough ampere turns each lead can be passed or looped through its reactor more than once.

Other advantages of my invention will now be readily apparent. By mounting my reactors inside the transformer tank the transformer apparatus is given a better appearance. Also, my reactors take up less space since the square corners of the conventional reactor core heretofore discussed are eliminated. Also, my reactors are smaller because there are two leads going through each reactor. That is, reactance is added to the transformer windings in four places.

While there has been shown and described particular embodiments of the invention, it will be obvious to those skilled in the art that changes and modifications may be made without departing from the invention, and that it is intended by the appended claims to cover all such changes and modifications as fall within the true spirit and scope of the invention.

What I claim as new and desire to secure by Letters Patent of the United States is:

1. A laminated reactor core comprising an insulating tube snugly surrounded by a plurality of annular metallic magnetic spring material portions, each of said portions being split entirely therethrough to form a gap therein, all of said gaps being superimposed with respect to each other and positioned on a same side of said insulating tube, said superimposed gaps having an insulating material wedge therein for adjusting the reactance of said reactor core.

2. A laminated reactor core comprising a plurality of axially aligned and stacked annular metallic magnetic spring material washers snugly surrounding an insulating material tube, each of said washers being in contact with said tube, each of said washers being cut entirely therethrough at an annular portion to form a gap therein, all of said gaps positioned on a same side of said insulating material tube and aligned in a line, said gaps being superimposed with respect to each other, and said aligned and superimposed gaps having an insulating material wedge therein for varying the reactance of said reactor core.

3. A laminated reactor core comprising a plurality of thin metallic magnetic spring material cylinders snugly concentrically disposed with respect to each other and snugly surrounding an insulating material tube, each of said cylinders being cut entirely therethrough along the entire length thereof to form an elongated gap, all of said gaps positioned on a same side of said insulating material tube and superimposed with respect to each other, and said superimposed gaps having an insulating material wedge therein for varying the reactance of said reactor core.

4. In a transformer apparatus comprising two secondary electrical windings and two hollow reactor cores, each of said windings having two leads of opposite polarity, the two of said leads having a like polarity passing through one of said reactor cores, and the two of said leads having a like polarity but opposite polarity from said last mentioned two leads passing through the other of said reactor cores.

5. In a transformer apparatus enclosed within a tank having four secondary winding terminal bushings thereon, said transformer apparatus having two secondary windings each having a pair of leads of opposite polarity, each of said leads being connected respectively to a different one of said terminal bushings, and two hollow reactor cores positioned within said tank, two of said leads of like polarity passing through one of said reactor cores, and the remaining two of said leads through the other of said reactor cores, the relative direction of the passage of said leads through said reactor cores being such that load current in the two leads passing through each reactor core produces cumulative magnetization of such core.

6. In a transformer apparatus comprising two secondary electrical windings and two laminated hollow reactor cores, each of said windings having two leads of opposite polarity, the two of said leads having a like polarity passing through one of said reactor cores, and the two of said leads having a like polarity but opposite polarity from said last mentioned two leads passing through the other of said reactor cores, each of said reactor cores comprising an insulating tube surrounded by a plurality of annular metallic spring material portions, each of said portions being split entirely therethrough to form a gap therein, all of said gaps superimposed with respect to each other and positioned on the same side of said insulating tube, said superimposed gaps adapted to receive an insulating material wedge to vary the reactance of said reactor core.

References Cited in the file of this patent
UNITED STATES PATENTS

| 1,182,997 | Fondiller | May 16, 1916 |
| 2,129,524 | Camilli | Sept. 6, 1938 |
| 2,290,680 | Franz | July 21, 1942 |
| 2,316,928 | Woodward | Apr. 20, 1943 |
| 2,354,331 | Polydoroff | July 25, 1944 |
| 2,358,631 | Garin | Sept. 19, 1944 |
| 2,535,712 | Wolfe | Dec. 26, 1950 |